Oct. 14, 1969 J. P. BARLOW ET AL 3,473,158
APPARATUS PROVIDING COMMON MEMORY ADDRESSING IN A SYMBOLICALLY ADDRESSED DATA PROCESSING SYSTEM
Filed March 7, 1966

INVENTORS
J. P. BARLOW
L.L. RAKOCZI
BY

United States Patent Office
3,473,158
Patented Oct. 14, 1969

3,473,158

APPARATUS PROVIDING COMMON MEMORY ADDRESSING IN A SYMBOLICALLY ADDRESSED DATA PROCESSING SYSTEM

J. P. Barlow, Reseda, Calif., and Laszlo L. Rakoczi, Phoenix, Ariz., assignors to General Electric Company, a corporation of New York

Filed Mar. 7, 1966, Ser. No. 532.262
Int. Cl. G11b *13/00;* G06f *15/00*
U.S. Cl. 340—172.5 11 Claims

ABSTRACT OF THE DISCLOSURE

A multiprogrammed computer system is disclosed in which the processing unit, each time it is to communicate with the data storage member, supplies the symbolic address of a storage cell in the storage member. An address translator converts a symbolic address of some sets of the symbolic addresses into corresponding actual address of a cell in a unique set of cells in the storage member. A symbolic address of other sets of symbolic address used by more than one program are translated into the actual address of the same cell in the storage member.

This invention relates to multicomputer and multiprogrammed systems and more particularly to apparatus for exercising management control of a multicomputer or multiprogrammed data processing system.

The multicomputer system is a data processing system comprising a plurality of data processing units, one or more data storage unit, and a plurality of input devices and output devices. The data processing units process data by executing separate program simultaneously and independently of each other. The data storage units store data to be processed, data which is the result of processing, and programs for controlling the processing operations of the data processing units. The input devices supply programs and data to be processed and the output devices receive and utilize processed data.

The multiprogrammed system is a data processing system wherein one or more data storage units store concurrently a plurality of independent programs or portions of such programs. A multiprogrammed system having but one data processing unit alternately executes the stored programs. The multicomputer system functions as a multiprogrammed system, wherein the plural data processing units simultaneously execute respective ones of the plural stored programs.

Communication must be provided within the data processing systems described to transfer programs and data to be processed from the data storage units to the data processing units and to transfer processed data from the data processing units to the data storage units. Communication must also be provided to transfer programs and data to be processed from the input devices to the data storage units and to transfer processed data from the data storage units to the output devices.

The apparatus of the instant invention provides management control for such multicomputer or multiprogrammed systems. Generally, management control of the multicomputer system described comprises expeditiously supplying data to be processed and the program providing the required data processing functions to the data processing units, and efficiently controlling the output devices to receive and utilize the processed data. This management control is effected by providing and controlling all re- data storage units and between input and output devices quired communications between data processing units and and data storage units; by providing for the assignment of programs to data processing units for execution in accordance with the required urgencies for execution of the different programs, the availability of the required input and output devices. the availability of the required data storage space in the data storage units, and the relative capabilities of the data processing units for executing the different programs; by providing termination of the programs nearing completion and their replacement with other waiting programs; by providing assignment of specific data storage units for programs to be executed; by providing assignment of specific input and output devices for programs to be executed, and initiation and termination of data transfer operations by these devices; by providing the corrective functions required when program or data errors are detected by the data processing units, or when the data processing units become partially or totally inoperative; etc.

Each data processing unit of a multicomputer or multiprogrammed system executes a program independently of the other stored programs. The program comprises a set of instructions, each instruction specifying a discrete type of processing operation. A data processing unit executes a program by sequentially responding to each of the instructions of the program to perform the corresponding operations. The data processing unit obtains the instructions of a program in sequence from a set of storage locations, or "cells," in the data storage system, which comprises the plurality of data storage units. Each such cell is identified by a unique identification, termed an "address". Thus, in obtaining the instructions of a program in proper sequence the data processing unit supplies the corresponding addresses in sequence. Additionally, many of the instructions during execution require the data processing unit to further communicate with the data storage system, either to obtain a data item on which the data processing unit is to perform an operation or to store a data item which is the result of an operation. Accordingly, each instruction requiring a transfer of a data item between the data processing unit and the data storage system must also identify the cell which is to supply or receive the data item. Therefore, each program requires a set of cells for storing and supplying data items to be processed by the program, for receiving and storing data items which are the result of processing operations performed by the program, and for storing the instructions of the program, many of the stored instructions comprising an identification of a cell in the set.

A program is only executed by the multicomputer or multiprogrammed system after it has been persented for execution by an input device. An advanced form of management control provides most effective and efficient execution of the waiting programs if, instead of waiting for the availability of specific storage space, each waiting program is accepted from an input device and transferred to the data storage system as soon as the data storage system has free any storage space which is of sufficient capacity and which is provided by the required combination of data storage unit types. After transfer to the data storage system these programs are executed according to their relative urgencies and the availability of the input and output devices required by each program.

However, in utilizing this advanced form of management control the particular portion of the data storage system in which a program is to be stored and executed is not determinable when the program is prepared or when it is being presented by an input device; instead, the storage portion to be employed varies according to the other programs already present when a program is accepted into the data storage system. Accordingly, the instructions in each program which identify data storage system cells can identify neither specific data storage units nor specific cells in a data storage unit; instead, the instructions can identify only symbolically the relative disposition of the cells in which the program is to be executed. In obtaining the instructions of the program in proper sequence, the data processing unit must employ in sequence symbolic identifications, or symbolic addresses, of cells appropriately disposed relative to the cells identified by the symbolic addresses provided by the instructions. Additionally, the symbolic addresses supplied by a data processing unit during execution of a program will identify symbolically a contiguous set of data storage system cells within which the instructions, the data items to be processed, and the processed data items are stored or to be stored.

The copending U.S. patent application Ser. No. 508,168 of J. P. Barlow, R. Barton, J. E. Belt, C. R. Frasier, L. A. Hittel, L. L. Rakoczi, M. A. Torfeh, and J. B. Wiener for Apparatus Providing Symbolic Memory Addressing to a Multicomputer System, filed Nov. 16, 1965, and assigned to the assignee of the instant invention, describes and claims an invention providing an advanced form of management control apparatus for a multicomputer or multiprogrammed system. The management control apparatus of the aforementioned patent application provides for simply, reliably and rapidly converting the symbolic identifications of the storage cells supplied by the programs and the data processing units into corresponding actual addresses of the storage cells in which the instructions of the program, the data items to be processed, and the processed data items are stored or to be stored. The management control apparatus comprises an address translator coupled to the data processing units for receiving each symbolic address as it is presented when a data processing unit is to communicate with the system of data storage units. Upon receiving each symbolic address the translator responds to generate a unique actual address which represents a specific cell in a specific data storage unit. Thus, the address translator employed in the aforementioned invention enables a plurality of programs employing similar series of symbolic addresses to communicate with unique portions of the data storage system for execution.

However, in a multiprogrammed system the operational entirety of each program is not necessarily unique. Certain sets of data and portions of programs are useful to many programs. For example, many programs have need for trigometric tables. Additionally, many programs require the execution of routine operations such as sorting and merging of data. In the system heretofore described, more efficient use is made of the available storage units if these generally useful data sets and routines are not a part of each program in which they are required. Instead, it is preferable that each program have access to these generally useful data sets and routines. In this event, the multiprogrammed system must be provided with means for the separately executed independent programs to communicate with the common data sets and routines. Therefore, although the programs must continue to employ symbolic addressing, apparatus should be provided to enable each program to communicate with the particular cells of the storage system containing the common useful information.

Therefore, it is an object of this invention to provide improved management control apparatus for implementing the effective and efficient execution of the programs in multicomputer and multiprogrammed systems.

Another object of this invention is to provide apparatus for enabling improved communication between a data storage system and a data processing unit which symbolically identifies locations in the data storage system.

Another object of this invention is to provide improved apparatus for effecting communication between different program portions in a multiprogrammed data processing system.

Another object of this invention is to provide apparatus for enabling the plural programs of a multiprogrammed system to communicate with and employ common data sets and routines.

Another object of the invention is to provide apparatus for enabling the plural programs of a multi-programmed system, which identify symbolically the cells of the data storage system, to communicate, in part, with unique respective cell groups and, in part, with common cell groups of the data storage system.

The foregoing objects are achieved, according to one embodiment of the instant invention, by providing a data processing system wherein symbolic data storage system identifications supplied by a data processing unit during execution of a program are applied to a translating apparatus, and wherein the translating apparatus translates one set of symbolic identifications to a respective set of unique actual designations of specific cells in specific data storage units and another set of symbolic identifications to a set of common actual designations of specific cells in specific data storage units. A data transmission member provides selective and controllable communication between the one or more data processing units and the one or more data storage units of the data processing system. When a data processing unit is to communicate with data storage system to receive an instruction, to receive a data item to be processed or to transmit a processed data item, the data processing unit supplies a signal group symbolically representing the address of a cell in the data storage system. An address translating device is coupled to the data processing units for receiving these symbolic addresses. Upon receiving each symbolic address the address translating device responds to generate a corresponding signal set which represents a specific cell in a specific data storage unit. The signal set so generated comprises an identification signal, which identifies a particular one of the data storage units, and a signal group representing the actual address of one of the cells in the identified data storage unit. For each received symbolic address provided by a unique portion of the originating program, the translating device generates a respective unique signal set identifying a specific cell accessible only to the originating program. For each received symbolic address provided for communication with a common data set or routine, the translating device generates a respective signal set identifying a specific cell storing one of the data items of the symbolically addressed common data set or routine.

Following generation of a signal set by address translating device, the identification signal controls additional apparatus to provide transfer of the actual address to the data storage unit designated by the identification signal. Upon receiving an actual address, a data storage unit initiates an operation to provide the required communication between the specifically addressed cell thereof and the initiating data processing unit through the data transmission member.

Certain portions of the apparatus herein disclosed are not of our invention, but are the inventions of:

J. P. Barlow, R. Barton, J.E. Belt, C. R. Frasier, L. A. Hittel, L. L. Rakoczi, M. A Torfeh, and J. B. Wiener, as defined by the claims of their application, Ser. No. 542,-768, filed Apr. 15, 1966; Centrally Controlled Multicomputer System.

J. P. Barlow, A. McLagan, L. L. Rakoczi, and M. A. Torfeh, as defined by the claims of their application, Ser. No. 543,237, filed Apr. 18, 1966; Apparatus Providing Alterable Symbolic Memory Addressing In a Multiprogrammed Data Processing System.

W. J. Broderick, C. R. Frasier, L. A. Hittel, G. R. Hope, Jr., E. J. Porcelli, and L. L Rakoczi, as defined by the claims of their application, Ser No. 544,023, filed Apr. 20, 1966; Apparatus Providing Interprocessor Communication in a Multicomputer System.

R. Barton, L. A. Hittel, L. L. Rakoczi, and J. B. Wiener, as defined by the claims of their application, Ser. No. 546,716, filed May 2, 1966; Data Processing Apparatus Providing Contiguous Addressing for Non-contiguous Storage.

C. R. Frasier, L. A. Hittel, J. R. Hudson, L. L. Rakoczi, D. L. Sansbury and J. B. Weiner, as defined by the claims of their application, Ser No. 550,037, filed May 13, 1966; Program Request Storage and Control Apparatus in a Multiprogrammed Data Processing System.

J. P. Barlow, S. F. Aranyi, L. L. Rakoczi, and M. A. Torfeh, as defined by the claims of their application, Ser. No. 550,562, filed May 16, 1966; Data Storage Access Control Apparatus for a Multicomputer System.

J. E. Belt, L. A. Hittel, G. R. Hope, Jr., E. J. Porcelli, and L. L. Rakoczi, as defined by the claims of their application, Ser. No. 551,355, filed May 19, 1966; Apparatus Providing Interprocessor Communications and Program Control in a Multicomputer System.

S. F. Aranyi, J. P. Barlow, R. Barton, L. L. Rakoczi, and M. A. Torfeh, as defined by the claims of their application, Ser. No. 551,657, filed May 20, 1966; Multiword Storage Access Control Apparatus for a Data Processing System.

J. P. Barlow, C. R. Jones, and J. L. Kerr, as defined by the claims of their application, Ser. No. 559,305, filed June 21, 1966; Apparatus Providing a Unique Decision Signal for Concurrent Interrogation Signals.

W. W. Chu and N. R. Crain, as defined by the claims of their application, Ser. No. 559,497, filed June 22, 1966; Apparatus for Providing Controllable Delays.

S. F. Aranyi, J. P. Barlow, E. J. Porcelli, L. L. Rakoczi, and M. A. Torfeh, as defined by the claims of their application, Ser. No. 568,343, filed July 27, 1966; Interprocessing Multicomputer Systems.

J. E. Belt, L. A. Hittel, and L. L. Rakoczi, as defined by the claims of their application, Ser. No. 612,560, filed Jan. 30, 1967; Apparatus Providing Identification of Programs in a Multiprogrammed System.

J. P. Barlow, R. Barton, L. L. Rakoczi, ad M. A. Torfeh, as defined by the claims of their application, Ser. No. 618,076, filed Feb. 23, 1967; Data Storage Access Control Apparatus for a Multicomputer System.

J. P. Barlow, R. Barton, E. J. Porcelli, L. L. Rakoczi, and M. A. Torfeh, as defined by the claims of their application, Ser. No. 619,377, filed Feb. 28, 1967; Data Storage Access control Apparatus for a Multicomputer System.

S. F. Aranyi, J. P. Barlow, L. L. Rakoczi, L. A. Hittel, and M. A. Torfeh, as defined by the claims of their application, Ser. No. 623,284, filed Mar. 15, 1967; Data Storage Access Control Apparatus for a Multicomputer System, and J. R. Judson, L. L. Rakoczi, and D. L. Sansbury, as defined in the claims of their application, Ser. No. 646,504, filed June 16, 1967; Program Interruption and Assignment Apparatus in a Multiprogrammed Data Processing System, all such applications being assigned to the assignee of the present application.

DESCRIPTION OF DRAWINGS

The invention will be described with reference to the accompanying drawings, wherein.

Figure 1:
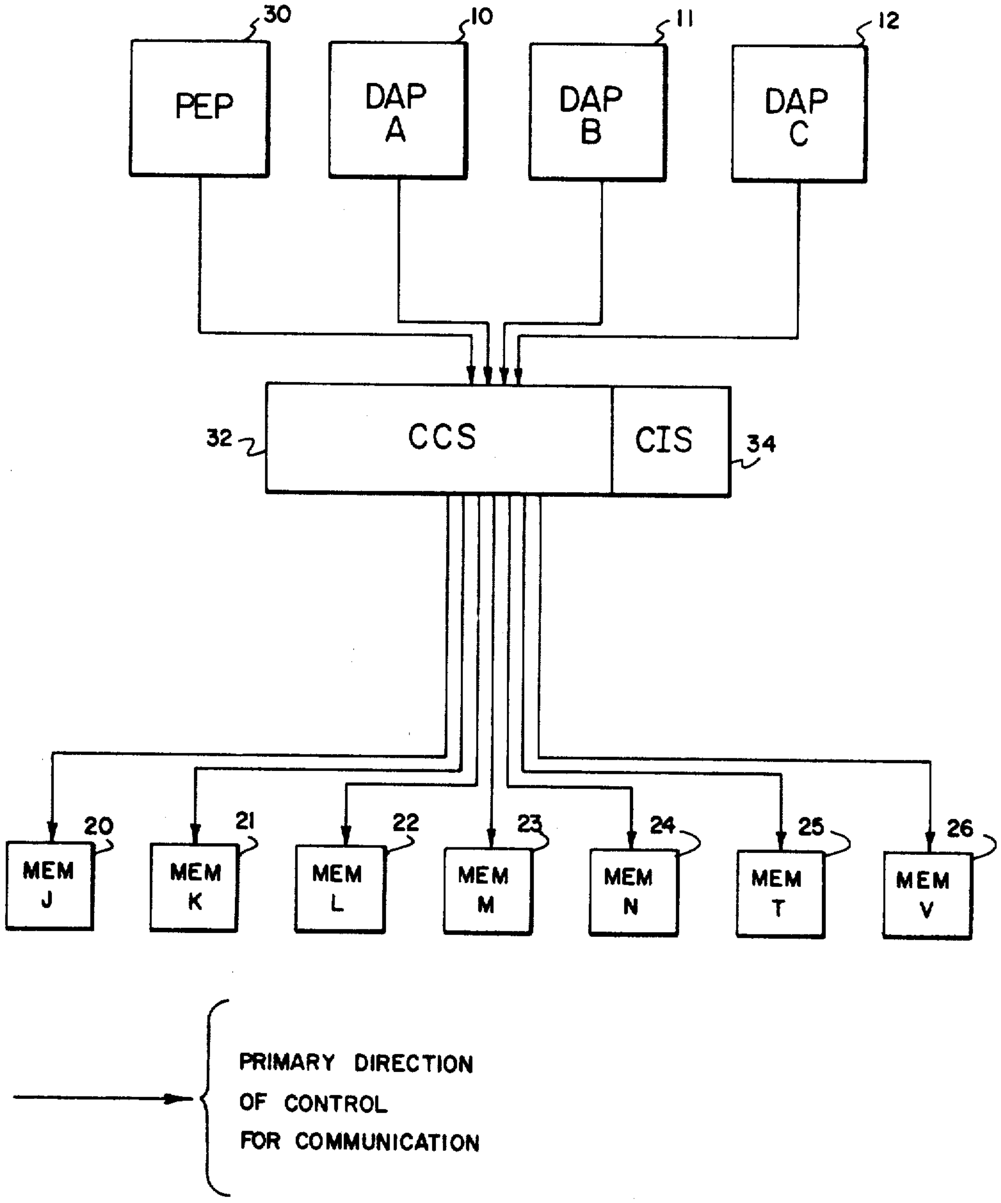
FIGURE 1 is a block diagram of a Multicomputer Data Processing System to which the instant invention is applicable.

For a complete description of the system of FIGURE 1 and of my invention, reference is made to U.S. patent application, Ser. No. 542,768, filed Apr. 15, 1966, entitled "Centrally Controlled Multicomputer System" by Jesse P. Barlow, Richard Barton, John E. Belt, Carlton R. Frasier, Lorenz A. Hittel, Laszlo L. Rakoczi, Mark A. Torfeh, and Jerome B. Wiener, and assigned to the assignee of the present invention. More particularly, attention is directed to FIGURES 2 through 110 of the drawings and to the specification beginning at page B–1, line 5, and ending at page N–64, line 16, inclusive of U.S. patent application, Ser. No. 542,768, which are incorporated herein by reference and made a part hereof as if fully set forth herein.

What is claimed is:

1. For employment with a plurality of data processing units and at least one data storage member, each of said members storing a data word in each one of a respective plurality of addressable storage cells, the combination comprising: a data word transmission member; each of said processing units being adapted to receive data words from said transmission member, to execute a respective sequence of operations on received data words in response to a corresponding sequence of data words representing instructions, to generate data words representing the results of said operations, and to transfer said generated result data words to said transmission member, each of said processing units supplying a first signal group symbolically representing an address of a cell in said storage member when said processing unit is to communicate with said storage member to execute each of said operations; each of said storage members being responsive to a second signal group representing the actual address of one of the cells in said storage member for transferring a data word between said cell and said transmission member; and an address translating device coupled to said processing units to receive said first signal groups and responsive thereto for generating corresponding second signal groups, said translating device providing a unique respective set of second signal groups for each of a first set of first signal groups supplied when each of said processing units is executing one of said sequence of operations and providing a common set of second signal groups for each of a second set of first signal groups supplied when each of said processing units is executing one of said sequence of operations, said translating device being coupled to deliver said second signal group to said storage members.

2. For employment with a system comprising at least one data processing unit and at least one data storage member, said member storing a data word in each one of a plurality of addressable storage cells, the combination comprising: a data word transmission member; said processing unit being adapted to receive data words from said transmission member, to execute a plurality of different operations on received data words, and to transfer data words representing the results of said operations to said transmission member, said processing unit supplying a first signal group symbolically representing an address of a cell of said storage member when said processing unit is to communicate with said storage member, said first signal group comprising a first signal subgroup symbolically identifying a block of contiguously addressable cells of said storage member and a second signal subgroup representing the relative location of a cell in one of said blocks; said storage member being responsive to a second signal group representing an actual address of one of said cells for transferring a data word between the addressed cell and said transmission member, said second signal group comprising said second signal subgroup and a third signal subgroup actually identifying one of said blocks; means for transferring said second signal subgroup from said processing unit to said storage member; and an address translating device coupled to said processing unit to receive said first signal subgroup and responsive thereto for generating said third signal subgroup, said translating device providing a unique respective third signal subgroup for each of a plurality of first signal subgroups and providing a common third signal subgroup for at least a pair of said first signal subgroups, said translating device being coupled to deliver said third signal subgroup to said storage member.

3. The system of claim 2 wherein said third signal subgroup represents the actual address of the first cell of one of said blocks.

4. The system of claim 2 wherein said first signal subgroup symbolically represents the address of the first cell of one of said blocks and said third signal subgroup represents the actual address of the first cell of one of said blocks.

5. For employment with a system comprising at least one data processing unit and a plurality of data storage members, each of said members storing a data word in each one of a respective plurality of addressable storage cells, the combination comprising: a data word transmission member; said processing unit being adapted to receive data words from said transmission member, to execute a plurality of different operations on received data words, and to transfer data words representing the results of said operations to said transmission member, said processing unit supplying a first signal group symbolically representing an address of a cell in said plurality of storage members when said processing unit is to communicate with said storage members, said first signal group comprising a first signal subgroup symbolically identifying a block of contiguously addressable cells in said storage members and a second signal subgroup representing the relative location of a cell in one of said blocks; each of said storage members being responsive to a second signal group representing the actual address of one of the cells in said storage member for transferring a data word between the addressed cell and said transmission member, said second signal group comprising said second signal subgroup and a third signal subgroup actually identifying one of said blocks; an address translating device coupled to said processing unit to receive said first signal subgroup and responsive thereto for generating one of said third signal subgroups and an identification signal representing one of said storage members, said translating device providing a unique respective third signal subgroup and identification signal combination for each of a plurality of first signal subgroups and providing a common third signal subgroup and identification signal combination for at least a pair of said first signal subgroups; and means coupled to receive said identification signal and responsive thereto for transferring the corresponding second and third signal subgroups to the one of said storage members represented by said identification signal.

6. For employment with a data processing unit and a data storage member, said member storing concurrently a plurality of portions of data processing programs, the data words of each of said portions being stored in a respective one of a plurality of addressable storage cells of said member, the combination comprising: a data word transmission member; said processing unit being adapted to receive data words from said transmission member, to execute a plurality of different operations on received data words, and to transfer data words representing the results of said operations to said transmission member; said processing unit supplying a first signal group symbolically representing an address of a cell in said storage member when said processing unit is to communicate with said storage member in executing an operation of a portion of one of said programs; said first signal groups being of sets of a first type and sets of a second type; said storage member being responsive to a second signal group representing the actual address of one of said cells for transferring a data word between said cell and said transmission member; and an address translating device coupled to said processing unit to receive said first signal groups and responsive thereto for generating said second signal groups, said translating device providing in response to a first signal group of the set of the first type a second signal group of a unique set, and providing in response to a first signal group of the set of the second type, a second signal group of a set common to at least two portions of programs stored in said storage member; said translating device being coupled to deliver said second signal groups to said storage member.

7. For employment with a data storage member and a plurality of data processing units, said member storing concurrently a plurality of portions of data processing programs, the data words of each of said portions being stored one in each of a plurality of addressable storage cells, the combination comprising: a data word transmission member; said processing units being adapted to receive data words from said transmission member, to execute a plurality of different operations on received data words, and to transfer data words representing the results of said operations to said transmission member; each of said processing units supplying a first signal group symbolically representing an address of a cell in said storage member when said processing unit is to communicate with said storage member in executing an operation of one of said programs; said first signal groups being of a first type and of a second type; said storage member being responsive to a second signal group representing the actual address of one of said cells for transferring a data word between said cell and said transmission member; and an address translating device coupled to said processing units to receive said first signal groups and responsive thereto for generating corresponding second groups, said translating device providing in response to a first signal group of the set of the first type, a second signal group of a unique set and in response to a first signal group of the set of the second type providing a second signal group of a set common to at least two portions of programs stored in said storage member; said translating device being coupled to deliver said second signal groups to said storage member.

8. For employment with a plurality of data processing units and a plurality of data storage members, a plurality of data processing programs adapted to be stored in said members; said members storing the data words of each program respectively in the addressable storage cells of said members, the combination comprising: a data word transmission member; said processing units being adapted to receive data words from said transmission member, to execute a plurality of different operations on received data words, and to transfer data words representing the results of said operations to said transmission member; each of said processing units, in executing an operation of a program, supplying a first signal group symbolically representing an address of a cell in said plurality of storage members when said processing unit is to communicate with said storage member; said first signal group being of a first type and of a second type; each of said storage members being responsive to a second signal group representing the actual address of one of the cells in said storage member for transferring a data word between said cell and said transmission member; and an address translating device coupled to said processing units to receive each first signal group, and responsive to the receipt of a first signal group of the set of the first type for generating second signal groups of a unique set and responsive to the receipt of a first signal group of a set of the second type for generating a second signal group of a set common to at least two of said programs, said translating device being coupled to deliver said second signal groups to said storage members.

9. The combination of claim 8 wherein said translating device is further coupled to deliver each of said second signal groups to the one of said storage members comprising the cell represented by said second signal group.

10. For employment with a system comprising at least one data processing unit and at least one data storage member, a plurality of data programs requiring a plurality of operations by said data processing units adapted to be stored in said member; said member storing data words of each of said programs, one word in each of the addressable storage cells of said member; the combination comprising: a data word transmission member; said processing unit being adapted to receive data words from said transmission member, to execute a plurality of different operations on received data words, and to transfer data words representing the results of said operations to said transmission member; said processing unit supplying a first signal group symbolically representing the address of a cell of said storage member when said processing unit is to communicate with said storage member, said first signal group being of two types; said storage member being responsive to a second signal group representing the actual address of one of said cells for transferring a data word between said cell and said transmission member; and an address generation device coupled to said processing unit for receiving each first signal group supplied by said processing unit, to generate a corresponding signal group, for each first signal group of a set of the first type for each program there being a unique respective second signal group and for each first signal group of a set of the second type for a plurality of programs there being a common second signal group; said generation device being coupled to deliver said second signal groups to said storage member.

11. A data processing system comprising: at least one data processing unit and at least one data storage member, said member adapted to store a plurality of programs, said member storing the data words of said programs in the addressable storage cells of said member; a data word transmission member; said processing unit being adapted to receive data words from said transmission member, to execute a plurality of different operations on received data words, and to transfer data words representing the results of said operations to said transmission member, said processing unit in executing an operation of a program requiring communication with the storage member supplying a first signal group symbolically representing an address of a cell in said storage member; said first signal group comprising a first signal subgroup symbolically identifying a block of contiguous addressable cells in said storage member and a second signal subgroup representing the relative location of the cells in one of said blocks; said storage member being responsive to a second signal group representing the actual address of one of said cells for transferring a data word between said cell and said transmission member; said second signal group comprising said second signal subgroup and a third signal subgroup actually identifying one of said blocks; and an address translating device coupled to said processing unit to receive each first signal subgroup supplied by said processing unit and responsive thereto for generating a third signal subgroup, said translating device providing the same third signal subgroup representing at least one actual block in said storage member each time a first signal subgroup representing a specific symbolic block is supplied to it and a unique respective third signal subgroup for each first signal subgroup representing other symbolic blocks; said translating device being coupled to deliver the third signal subgroup to said storage member; and means for delivering said second signal subgroup to said storage member.

References Cited

UNITED STATES PATENTS

| | | | |
|---|---|---|---|
| 3,319,226 | 5/1967 | Mott et al. ------ | 340—172.5 |
| 3,317,899 | 5/1967 | Chien et al. ------ | 340—172.5 |
| 3,311,888 | 3/1967 | Hanan et al. ------ | 340—172.5 |
| 3,311,887 | 3/1967 | Muroga ------ | 340—172.5 |
| 3,303,477 | 2/1967 | Voigt ------ | 340—172.5 |
| 3,292,151 | 12/1966 | Barnes et al. ------ | 340—172.5 |
| 3,284,779 | 11/1966 | Lee et al. ------ | 340—172.5 |
| 3,270,324 | 8/1966 | Meade et al. ------ | 340—172.5 |

GARETH D. SHAW, Primary Examiner